United States Patent
Sadjadpour

(10) Patent No.: US 11,593,528 B2
(45) Date of Patent: Feb. 28, 2023

(54) COMPACT KEY WITH REUSABLE COMMON KEY FOR ENCRYPTION

(71) Applicant: The Regents of the University of California, Oakland, CA (US)

(72) Inventor: Hamid R. Sadjadpour, Santa Cruz, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 109 days.

(21) Appl. No.: 16/842,306

(22) Filed: Apr. 7, 2020

(65) Prior Publication Data

US 2020/0320227 A1    Oct. 8, 2020

Related U.S. Application Data

(60) Provisional application No. 62/830,912, filed on Apr. 8, 2019.

(51) Int. Cl.
| | | |
|---|---|---|
| *G06F 21/78* | (2013.01) | |
| *H04L 9/08* | (2006.01) | |
| *G06F 21/60* | (2013.01) | |

(52) U.S. Cl.
CPC ............ *G06F 21/78* (2013.01); *G06F 21/602* (2013.01); *H04L 9/0869* (2013.01); *H04L 9/0897* (2013.01)

(58) Field of Classification Search
None
See application file for complete search history.

(56) References Cited

U.S. PATENT DOCUMENTS

| | | | | |
|---|---|---|---|---|
| 7,752,453 B2* | 7/2010 | Stedron | .................. | H04L 9/065 713/189 |
| 8,548,171 B2* | 10/2013 | McGrew | ............... | H04L 9/0891 380/263 |
| 11,095,442 B1* | 8/2021 | Mandich | ............... | H04L 9/0662 |
| 11,323,247 B2* | 5/2022 | Kuang | .................. | H04L 9/065 |
| 2003/0091193 A1* | 5/2003 | Bunimov | ............... | H04L 9/065 380/278 |
| 2007/0253548 A1* | 11/2007 | Kameyama | ......... | G06F 21/6218 380/28 |

(Continued)

OTHER PUBLICATIONS

Bhattad, et al., Weakly secure network coding. NetCod, Apr. 104, 2005.

(Continued)

*Primary Examiner* — Michael Pyzocha
(74) *Attorney, Agent, or Firm* — Wolter Van Dyke Davis, PLLC; Eugene J. Molinelli; John L. DeAngelis

(57) ABSTRACT

Techniques for secure public exposure of digital data include extracting first digital data comprising one or more batches, each batch comprising a plurality of no more than a number T of packets, each packet containing a plurality of a number n of bits. A random binary matrix A consisting of T rows and n columns is generated. For a first batch, a first random n-bit temporary key is generated. For a packet in the first batch, a first packet vector key is generated based on random non-overlapping pairs of bit positions for both the temporary key and for a first packet-corresponding row of matrix A. An encrypted packet is generated for the packet based on the packet and the first packet vector key. The encrypted packet is exposed publicly.

30 Claims, 6 Drawing Sheets

(56) References Cited

U.S. PATENT DOCUMENTS

| | | | | |
|---|---|---|---|---|
| 2009/0010428 | A1* | 1/2009 | Delgosha | H04L 9/0844 380/30 |
| 2010/0281336 | A1* | 11/2010 | Seurin | H04L 9/0838 714/755 |
| 2015/0188701 | A1* | 7/2015 | Nordholt | H04L 9/0852 713/171 |
| 2017/0331622 | A1* | 11/2017 | Kawai | H04L 9/3066 |
| 2019/0132117 | A1* | 5/2019 | Kuang | H04L 9/065 |

OTHER PUBLICATIONS

Cai, et al., Secure network coding. In Information Theory, 2002. Proceedings. 2002 IEEE International Symposium on, p. 323. IEEE, 2002.

Dikaliotis, et al., Security in distributed storage systems by communicating a logarithmic number of bits. In Information Theory Proceedings (ISIT), 2010 IEEE International Symposium on, pp. 1948-1952. IEEE, 2010.

Dimakis, et al., Distributed fountain codes for networked storage. In Acoustics, Speech and Signal Processing, 2006. ICASSP 2006 Proceedings. 2006 IEEE International Conference on, vol. 5, pp. V-V. IEEE, 2006.

Dimakis, et al., Network coding for distributed storage systems. IEEE Transactions on Information Theory, 56(9):4539-4551, 2010.

Forney, On the role of MMSE estimation in approaching the information-theoretic limits of linear gaussian channels: Shannon meets wiener. arXiv preprint cs/0409053, 2004.

Harrison, et al., Physical-layer security: Combining error control coding and cryptography. In Communications, 2009. ICC'09. IEEE International Conference on, pp. 1-5. IEEE, 2009.

Kadhe, et al., On a weakly secure regenerating code construction for minimum storage regime. In Communication, Control, and Computing (Allerton), 2014 52nd Annual Allerton Conference on, pp. 445-452. IEEE, 2014.

Kadhe, et al., Weakly secure regenerating codes for distributed storage. In Network Coding (NetCod), 2014 International Symposium on, pp. 1-6. IEEE, 2014.

Kiskani, et al., Throughput analysis of decentralized coded content caching in cellular networks. IEEE Transactions on Wireless Communications, 16(1):663-672, 2017.

Kiskani, et al., A secure approach for caching contents in wireless ad hoc networks. IEEE Transactions on Vehicular Technology, 66(11):10249-10258, 2017.

Kiskani, et al., Secure and private cloud storage systems with random linear fountain codes. In Cloud and Big Data Computing (CBDCOM), 2017 International Conference on. IEEE, 2017.

Kiskani, et al., Low complexity secure code (LCSC) design for big data in cloud storage systems. In Communications (ICC), 2018 International Conference on. IEEE, 2018.

Kumar, et al., Secure repairable fountain codes. IEEE Communications Letters, 20(8): 1491-1494, 2016.

Kwak, et al., Physical layer security with yarg code. In Emerging Network Intelligence, 2009 First International Conference on, pp. 43-48. IEEE, 2009.

Pawar, et al., On secure distributed data storage under repair dynamics. In Information Theory Proceedings (ISIT), 2010 IEEE International Symposium on, pp. 2543-2547. IEEE, 2010.

Pawar, et al., Securing dynamic distributed storage systems against eavesdropping and adversarial attacks. IEEE Transactions on Information Theory, 57(10):6734-6753, 2011.

Pawar, et al., Securing dynamic distributed storage systems from malicious nodes. In Information Theory Proceedings (ISIT), 2011 IEEE International Symposium on, pp. 1452-1456. IEEE, 2011.

Rawat, et al., Optimal locally repairable and secure codes for distributed storage systems. IEEE Transactions on Information Theory, 60(1):212-236, 2014.

Shah, et al., Information-theoretically secure regenerating codes for distributed storage. In Global Telecommunications Conference (GLOBECOM 2011), 2011 IEEE, pp. 1-5. IEEE, 2011.

Shannon, Communication theory of secrecy systems. Bell Labs Technical Journal, 28(4):656-715, 1949.

Yan, et al., Algorithms for weakly secure data exchange. In Network Coding (NetCod), 2013 International Symposium on, pp. 1-6. IEEE, 2013.

Yan, et al., Weakly secure data exchange with generalized reed solomon codes. In Information Theory (ISIT), 2014 IEEE International Symposium on, pp. 1366-1370. IEEE, 2014.

* cited by examiner

COMPACT KEY WITH REUSABLE COMMON KEY FOR ENCRYPTION

CROSS-REFERENCE TO RELATED APPLICATIONS

This application claims benefit of Provisional Appln. 62/830,912, filed Apr. 8, 2019, the entire contents of which are hereby incorporated by reference as if fully set forth herein, under 35 U.S.C. § 119(e).

BACKGROUND

Claude Shannon introduced a cipher system in [1] which achieves perfect secrecy. The notion of perfect secrecy in Shannon's work means that no eavesdropper can deduce any information about the transmitted message regardless of its computational power. He studied the fundamental communication requirements that are necessary and sufficient to guarantee that "Alice" can send messages to "Bob" in a way that "Eve" cannot obtain any information about the transmitted messages. Shannon proved that if Alice uses a different key, selected uniformly at random from the set of all keys for each message, then perfect secrecy is achievable. This communication channel has been studied extensively since then and is the basis for sensitive communication systems including the one-time-pad (or Vernam pad) system used for communications between Moscow and Washington, D.C. during the cold war. However, the downside of this system is the size of the key which should be as large as the size of the message to guarantee secure communications.

SUMMARY

Techniques are provided for using a compact key for encryption of data for public exposure, such as cloud storage, that provides a substantially higher level of security, including perfect security in some embodiments, with substantially smaller keys than in previous approaches, or some combination.

In a first set of embodiments, a method implemented on a hardware processor provides secure public digital storage. The method includes extracting first digital data comprising one or more batches. Each batch includes no more than a number T of packets (T>1); and, each packet contains a number n of bits (n>1). The method also includes generating a random binary matrix A consisting of T rows and n columns. For a first batch, a first random n-bit temporary key is generated. Further, the method includes, for each packet in the first batch, generating a packet vector key based on random non-overlapping pairs of bit positions for both the temporary key and for a row of matrix A which corresponds to the number of the packet in the batch. Still further, the method includes generating an encrypted packet for the packet based on the packet and the packet vector key. Even further yet, the method includes exposing the encrypted packet publicly.

In other sets of embodiments, a computer readable medium, or apparatus, or system is configured to perform one or more steps of the above method or to store or decode the encoded data produced by the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
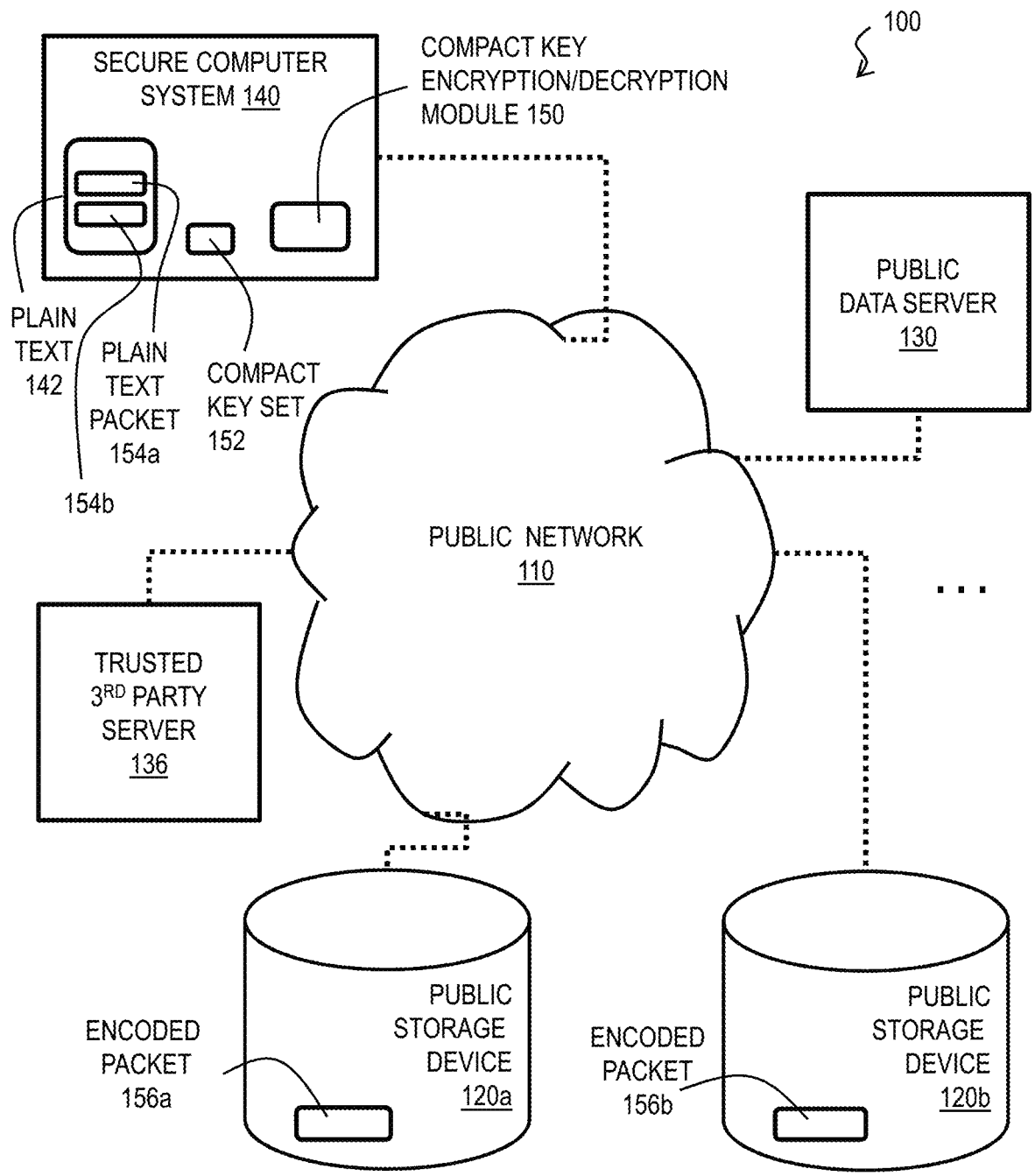
FIG. 1 is a block diagram that illustrates an example system for producing encoded data that is exposed to the public with complete secrecy and a compact key, according to an embodiment.

A method, computer readable medium, apparatus and system are described for compact key encoding of data for public exposure, such as in cloud storage. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of public cloud-based data storage, e.g., data storage on a network that is at least in part exposed to public access. However, the invention is not limited to this context. In other embodiments the encoding is used in communications, such as over wireless cellular and ad hoc networks, with a trusted partner for whom a perfectly secure channel is available for delivering the compact key or plaintext or some combination.

1. DESCRIPTION OF PROBLEM

In the classical Shannon problem, Alice uses a random coding mechanism to achieve perfect secrecy by encoding a message with a unique key that is selected uniformly at random from the set of all keys. The number of keys is at least as large as the number of messages. Bob also gets the same set of keys and uses them for decoding. Eve does not have these keys and cannot decode. In this scheme, if Alice wants to achieve perfect secrecy for data transmission, she needs to transmit all random keys to Bob and Bob needs to store them for data decryption. Since the size of key bits is as large as the size of message bits, using Shannon cipher for many applications including distributed cloud storage systems is not practical.

The communication model in distributed cloud storage systems is different from traditional communication model discussed by Shannon in [1]. In a cloud storage model, Alice wants to store some data on the cloud and retrieves them later. In other words, Bob is the same as Alice; but, the retrieval is performed at a later time. Alice intends to prevent Eve from obtaining any information about the stored contents in the cloud.

If Alice wants to achieve perfect secrecy similar to the traditional Shannon cipher system, she needs to locally and securely store a separate key for each message that she stores on the cloud and then use that key to retrieve the message from the stored cipher-text. Therefore, she will need the same size of local storage to store securely the keys. This clearly does not benefit from the advantage of offsite massive storage offered by cloud storage; and, thus, is not a practical way to use cloud storage systems. Even assuming that Alice has such a storage capability, Alice would be better off not to store any data on the cloud; but, instead to store the plaintext files locally instead of the keys! Therefore, Shannon's scheme does not work for cloud storage systems in practice.

Using codes like Maximum Distance Separable (MDS) is very common in storage systems [2] due to their repair capabilities. However, certain requirements are needed to secure the applications that use these codes. Authors in [3] studied the security of distributed storage systems with MDS codes. Pawar et al. [4] studied the secrecy capacity of MDS codes. The authors in [5], [6] also proposed security measures for MDS coded storage systems. Shah et al. [7] proposed information-theoretic secure regenerating codes for distributed storage systems. Rawat et al. [8] used Gabidulin codes together with MDS codes to propose optimal locally repairable and secure codes for distributed storage systems. All these references [2]-[9] used an existing forward error correction code and by modifying it, they provided security for distributed storage systems.

Kumar et al. [10] have proposed a construction for repairable and secure fountain codes. Reference [10] achieves security by concatenating Gabidulin codes with Repairable Fountain Codes (RFC). Their specific design allows one to use Locally Repairable Fountain Codes (LRFC) for secure repair of the lost data. Unlike [10] which has focused on the security of the repair links using concatenated codes, the novel methods described below provide security for the data storage by only using a novel code design that can achieve perfect secrecy with minimal key size.

Network coding schemes have been shown to be very efficient from a security point of view. Cal and Young [11] showed that network coding can be used to achieve perfect secrecy when network encoded files are sent through multiple paths and only one of the paths is compromised. Bhattad et al. [12] studied the problem of "weakly secure" network coding schemes in which even without perfect secrecy, no meaningful information can be extracted from the network during transfer of data. Subsequent to [12], Kadhe et al. studied the problem of weakly secure storage systems in [13], [14]. Yan et al. also proposed [15], [16] algorithms to achieve weak security and also studied weakly secure data exchange with generalized Reed Solomon codes. In contrast, the novel method described below designed for cloud storage systems, encode the messages by combining them with each other to create the ciphertext. Hence, the ciphertext will not be independent of the message and the Shannon criteria may not be valid. Therefore it might be intuitive to think that these codes can only achieve weak security as opposed to perfect security. However, it is shown in subsequent sections that the unique code construction described below results in perfect secrecy. It is even shown that the unique code construction described below can efficiently reduce the required key size to achieve such perfect secrecy.

Recently, there has been a lot of interest in studying methods of achieving physical layer security through the use of coding techniques [17]. The authors in [18] have proposed a new scheme to use error control codes for cryptography purposes. In [19], the authors provided physical layer security with a special code design. The authors in [20]-[23] studied different methods for achieving asymptotic perfect secrecy using coding techniques. In [20], they proposed a method for achieving asymptotic perfect secrecy in wireless networks using random coding of cached contents. This method is then extended to include secure content update in [22]. In [23], they proposed new coding schemes which are able to provide asymptotic perfect secrecy and privacy at the same time. Note that these works also relied on specific known forward error correction code. In all prior work in literature, asymptotic perfect secrecy was achieved which required the use of infinite size data in order to achieve perfect secrecy. Clearly, this is not a practical solution for perfect security.

Later in [24], for the first time, the authors introduced the concept of codes only for security without any error correction capability by using sparse vectors to achieve asymptotic perfect secrecy in cloud storage systems. The proposed method in [24] significantly outperforms Advanced Encryption Standard (AES) in terms of computational complexity while providing asymptotic perfect secrecy. That coding scheme [24] has the unique ability of providing asymptotic perfect secrecy with low decoding complexity. The new code for security introduced in [24] still suffered from the problem of achieving perfect secrecy asymptotically which does not make this technique completely secure.

In the inventor's previous work [26] a compact key was used to achieve perfect security with finite size by encoding the data with an additional random bit at a random location. Here efficient encryption is achieved without encoding an additional bit.

2. OVERVIEW OF SOLUTION

In the techniques developed here, an answer was sought to the following question. Is it possible to leverage the unity of Alice and Bob in the cloud storage model to achieve perfect secrecy in practice or to rely on storage of a very small amount of local data for keys, or some combination? A solution is presented in which perfect secrecy in clouds can be achieved with much smaller key size than the file size and with less complexity than introduced in [26]. In addition, the encrypted or encoded data takes no more space than the plaintext, because a random bit is not inserted at any position, as in [26].

As opposed to [24], these techniques focus on achieving perfect secrecy instead of merely asymptotic perfect secrecy (achieving perfect secrecy asymptotically as the key size increases). Further, code design is of interest, which can achieve perfect secrecy with minimal key size. As mentioned in the introduction, using Shannon cipher for cloud storage systems does not seem practical due to the need for large key storage. Here is presented a solution to overcome this issue. These techniques provide a practical scheme to achieve perfect secrecy with minimal required key storage overhead. This focus on practical aspects of code design makes it suited for use in distributed cloud storage systems.

FIG. 1 is a block diagram that illustrates an example system 100 for producing encoded data that is exposed to the public with complete secrecy and a compact key, according to an embodiment. A public network 110 is used to communicate data among various nodes on the network, such as one or more public data servers, e.g., server 130, and one or more public storage devices, e.g., devices 120a and 120b, collectively referenced hereinafter as public storage devices 120. On a secure computer system 140, resides some plaintext data 142 that is to be kept secret from public access. In an approach described in more detail below, a compact key encoding/decoding module 150 executes on system 140 to define a compact key 152 and successively encode a group of up to a number T of plain text packets (T>1), e.g., packets 154a and 154b, collectively referenced hereinafter as a group of plaintext packets 154 of the plaintext data 142. In some embodiments, T is about 100; in various embodiments, T is selected to be in a range from about 2 to about 10, from about 10 to about 100, or from about 100 to about 1000. The encrypted packets, 156a and 156b, respectively, are ciphertext that can be safely exposed to the public, such as being communicated over public network 110 or stored in one or more public storage devices 120, without divulging the plaintext packets 154. In a distributed cloud storage system, the two encrypted packets 156a and 156b are stored on different public storage devices 120a and 120b, respectively. A characteristic and advantage of the system 100 is that the size of the compact key 152 is much less than the size of the plaintext data 142 being encoded as packets 156. After public storage of encrypted packets 156 and secure storage of the compact key set 152, the plaintext 142 or packets 154 can be removed from the local machine such as computer system 140.

In some embodiments, the module 150 and compact key set 152 or both reside on another device, such as public data server 130 or trusted third party server 136. In such embodiments, there is a secure channel between the secure computer system 140 and the public data server 130 or the trusted $3^{rd}$ party server 136, such as a virtual private network (VPN), and the public data server or $3^{rd}$ party server 136 is trusted to keep secure the plaintext data 142 and the compact key set 152. In such embodiments, the plaintext 142 or plaintext packets 154 are transmitted securely to the public data server 130 or trusted $3^{rd}$ party server 136, where the module 150 is executed to use or generate the compact key set to produce the encrypted packets 156, and store those packets 156 on one or more public storage devices 120.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, in some embodiments, two or more encrypted packets 156, such as a group of T packets encoded together, are stored on the same public storage device 120. In some embodiments, each of one or more of the secure computer system 140 or public data server 130 or public storage device 120 is a computer system as described below in reference to FIG. 4, or a chip set as described below in reference to FIG. 5, or a mobile terminal, such as a tablet or cell phone, as described below in reference to FIG. 6, or some combination.

As described in the following sections, perfect security can be achieved with the encoding scheme presented here. In contrast, Shannon perfect secrecy, also known as one-time pad, can only be achieved by using exactly a different key bit for each information bit. This requirement makes the implementation of perfect secrecy impractical in most applications. As described below, a novel coding scheme for security achieves perfect secrecy with only a fraction (~1/T) of the bits in the plaintext (where T is the number of packets using a temporary key), regardless of the size of the packet. The coding scheme has been applied to distributed cloud storage systems. Further, optimal code for security is defined and it has been shown that the proposed approach is optimal.

3. METHOD FOR ENCODING

Figure 2:
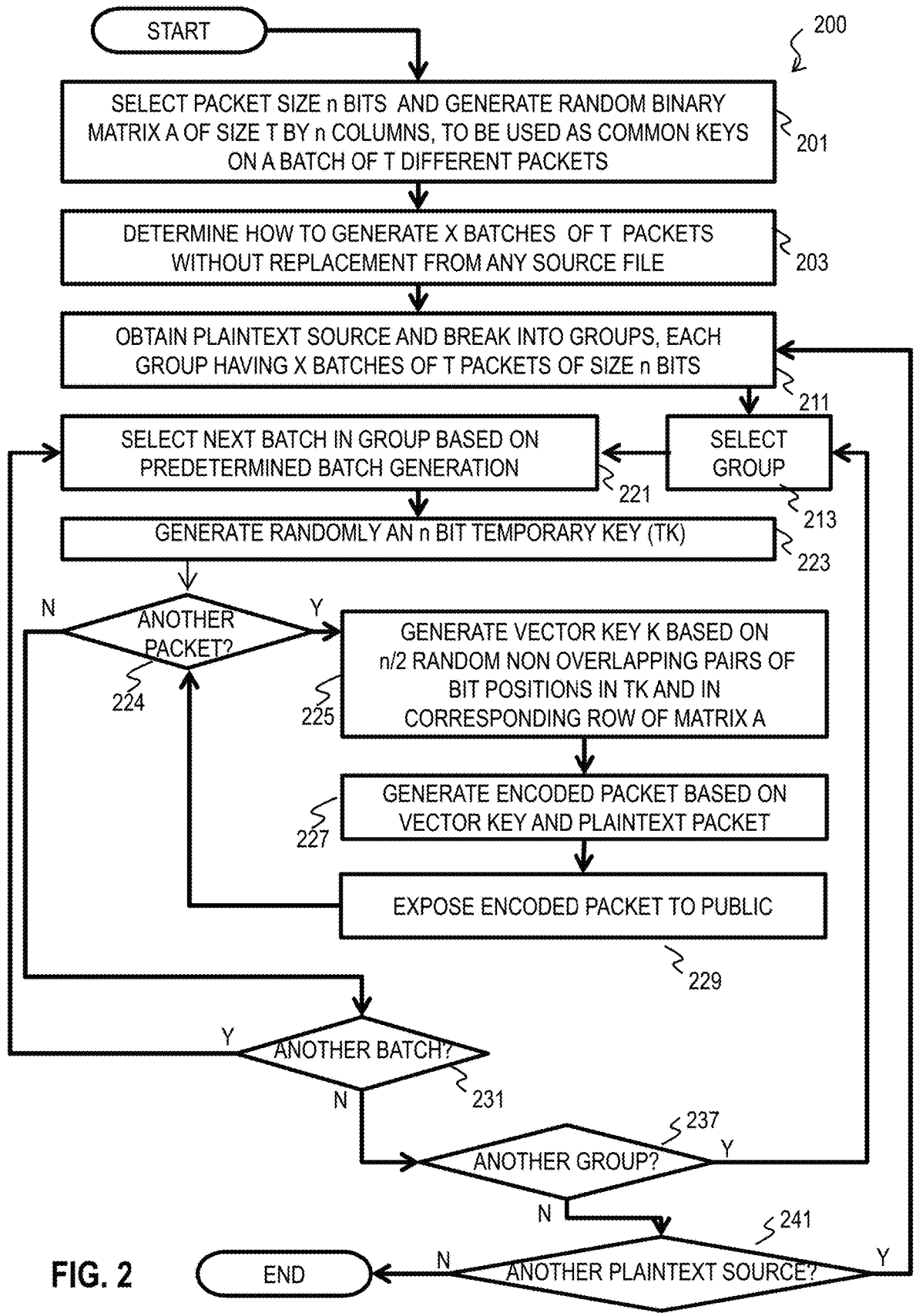
FIG. 2 is a flow diagram that illustrates an example method for producing encoded data with a compact key, according to an embodiment.

FIG. 2 is a flow diagram that illustrates an example method 200 for producing encoded data with a compact key, according to an embodiment. An advantage of this method is perfect or near perfect secrecy without increasing the size of the plaintext. Although steps are depicted in FIG. 2 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, a number n of bits is selected as a size for a packet 154. Because the number of bits encoded per operation is a function of packet size, there is incentive to make packet size n large, and there is no limit on how large n can be. However, because the complexity of the operation and size of the key set increases with n, there is an incentive to make n small. There is no need for n to be a power of two; but, in some embodiments it is advantageous for n to be a power of two. A practical range for n is about 4 to about 10,000, with many embodiments using n in a range from about 10 to about 1000 (e.g., 8 to 1024 if a power of two is advantageous). A number T of packets 154 encoded together form a batch of size T packets—or Tn bits. Because the number of bits encoded per operation is a function of batch size, there is incentive to make batch size T large, and there is no limit on how large T can be. However, because the complexity of the operation and size of the key set increases with T there is an incentive to make T small. There is no need for T to be a power of two; but, in some embodiments it is advantageous for T to be a power of two. A practical range for T is about 4 to about 10,000, with many embodiments using T in a range from about 10 to about 1000 (e.g., 8 to 1024 if a power of two is advantageous). The packets of one batch are expressed by Equation 1a through Equation 1b.

$$Pi = [p_i^1, p_i^2, \ldots, p_i^n] \quad (1a)$$

$$i = 1, T \quad (1b)$$

where n is the number of bits in one packet, and $p_i^j$=jth bit of packet i, where j=1, n. A batch of T packets of equal size are selected to be encrypted in a nested process.

A random binary matrix A of size T rows by n columns is generated to provide a set of common keys to use in the process. Each row of this matrix A is unique, has a uniform distribution for the probability of zeros and ones, and is statistically independent from other rows and from the data to be encrypted.

The process is repeated until all the original plaintext file or files have been encrypted. The number X of batches that are used to encode an original plaintext file or files 142 of size Z bits is then Z/(Tn) rounded up to the next integer. These X batches form one group. Multiple different groups can be encoded or decoded using the same techniques, using the same or a different matrix A.

The element of matrix A in the ith row and jth column is represented by $a_i^j$. The ith row is represented by $A_i$ and is made of the columns as expressed in Equation 2a $$A_i = [a_i^1, a_i^2, \ldots, a_i^n] \quad (2a)$$

The entire matrix A is represented by the rows in Equation 2b.

$$A = \begin{bmatrix} A_1 \\ A_2 \\ A_3 \\ \ldots \\ A_T \end{bmatrix} \quad (2b)$$

The matrix A is generated during step 201.

In step 203, an algorithm is adopted to generate X batches with or without replacement from any set of one or more files to be encrypted. Without replacement is preferred to prevent the encrypted file from being larger than the original files. For example, in some embodiments, the set of one or more files are sampled successively in batches of Tn bits. In another example, the value of X is determined and every Xth digit starting at digit 1 is assigned to a first batch, and every Xth digit starting at digit 2 is assigned to a second batch, and every Xth digit starting at digit 3 is assigned to a third batch, and so on until X batches have been formed.

In step 211, a source of plaintext is obtained and broken up into one or more groups, each group including X batches, each batch including T packets of n bits. Any method may be used to obtain the plaintext, including receiving manual or automatic input that indicates one or more files or database stored locally or remotely, or receiving data packets according to one or more protocols for packet transmission over a local or private or public network, either unsolicited or in response to a query message.

In step 213, the first or next group is selected. In step 221, the next batch in the current group is selected based on the algorithm for generating X batches for a source file developed in step 203.

In step 223, for the current batch selected in step 221, an n-bit random temporary key $\mathcal{TK}$ is generated uniformly at random from the set of all n-bit strings. This key is statistically independent of the packets to be encrypted and of the common key, i.e., the rows in matrix A. The temporary key $\mathcal{TK}$ is only generated once for each batch of T packets, but is used to produce a unique vector key for each packet in the batch, as described below for step 225. The element of temporary key $\mathcal{TK}$ in the jth column is represented by $tk^j$, so the full temporary key is expressed by Equation 3.

$$\mathcal{TK} = [tk^1, tk^2, \ldots, tk^n] \quad (3)$$

In step 224, it is determined whether there is another packet in the batch not yet encrypted, including the first packet. If so, control passes to step 225 and following steps to generate and apply a vector key for the packet. If not, control passes to step 231 described below to determine whether there is another batch in the group to be encrypted.

In step 225, a packet specific vector key $K_i$ for the ith packet is generated based on randomly selected pairs of bit positions used to select bits in the temporary key and in the matrix A of common keys. Thus, step 225 includes generating a first packet vector key based on random non-overlapping pairs of bit positions for both the temporary key and for a first packet-corresponding row of matrix A. The non-overlapping pairs of bit positions are stored with the compact key e.g., in the compact key set 152. The vector key has elements to be applied to the jth column of the ith packet, as expressed in Equation 4.

$$K_i = [k_i^1, k_i^2, \ldots, k_i^n] \quad (4)$$

For example, in some embodiments, bit positions (numbers in the range 1 to n) are randomly paired for every position (e.g., every number in the range 1 to n). Without loss of generality, it is assumed that n is even. Therefore, there are n/2 pairs that are non-overlapping; and, the union of them provides all numbers in the range from 1 to n, inclusive. Assume one pair has elements of j1 and j2 where 1≤j1, j2≤n. If n is odd, then for the unpaired "pair," the (n/2+0.5)th "pair," j1=j2. The elements of the vector key are determined as given by Equations 5a and 5b.

If $1 - tk^{j1} \oplus a_i^{j1} = 0$ then $k_i^{j1} = tk^{j1} \oplus a_i^{j1}$ and $$k_i^{j2} = tk^{j2} \oplus a_i^{j2} \quad (5a)$$

If $1 - tk^{j1} \oplus a_i^{j1} = 1$ then $k_i^{j1} = tk^{j2} \oplus a_i^{j2}$ and $$k_i^{j2} = tk^{j1} \oplus a_i^{j1} \quad (5a)$$

Where $\oplus$ indicates an exclusive OR (XOR) operator.

In step 227, an encrypted packet $\mathcal{F}i$. is generated by performing the exclusive OR as expressed in Equation 6.

$$\mathcal{F}i = K_i \oplus P_i \quad (6)$$

In step 229, this encrypted packet is then safely exposed to the public, such as storing the encrypted packet in distributed cloud storage, without revealing the information in the plaintext. For example, the encrypted packet is stored on public storage device 120*a*.

In step 231, it is determined whether there is another batch of packets in the group to process. If so, control passes back to step 221 to select the next batch of packets in the group. Otherwise control passes to step 237.

To retrieve the information in the plaintext, this encrypted packet is used in combination with multiple encrypted packets for the same batch. For each batch there are up to T such encrypted packets, e.g., stored on the same or different public storage devices 120. The T encrypted packets can be used with the compact key set to reconstruct the original plaintext for the group.

In step 237, it is determined if there is another group of batches in the original plaintext source to encode or encrypt. If so, then control passes back to step 213 to select the next group. If not, then the entire original plaintext source has been encoded; and, control passes to step 241.

In step 241, it is determined if there is another plaintext source to encode. If so, then control passes back to step 211 to obtain the next plaintext file, and break it up into a new set of groups and batches. If not, then all plaintext sources have been encoded; and, the process ends.

In some embodiments, the encrypted packets are not exposed to public devices in step 229 until several or all of the encrypted packets for the current batch, or for one or more groups, are produced. Thus, in various embodiments, step 229 is moved to occur after step 231 and before step 237, or to after step 237 and before step 241, or to after step 241.

For decoding, one or more of the T encrypted packets produced in the loop of steps 221 to 231 are retrieved. For example, the ith encrypted packet is retrieved. The ith vector key is generated based on stored values in the compact key set for A, $\mathcal{TK}$, and the packet specific random pairing of bit positions. In addition, it takes n bits to specify the random pair, or at least n−2 bits; but, this is only done once for all the files, so it does not add substantially to the size of the key. The newly generated vector key is then used in Equation 7.

$$P_i = K_i \oplus \mathcal{F}_i \quad (7)$$

4. SIZE OF COMPACT KEY

The amount of storage for the compact key set in the above method compares favorably with that of Shannon. Shannon one-time pad approach requires one unique key of equal size to each packet in order to achieve perfect secrecy. This section determines the storage requirement for the proposed technique and comparing it with that of Shannon. Unlike Shannon approach, the proposed technique uses two types of keys to generate the final key and one of these keys is used for many groups of files. Each batch includes T packets, each one containing n bits. Assume the common keys are used X times for X batches. Clearly, X is a finite number and at some point, a new matrix A of common keys is generated in order to assure that each final key is only used once. However, X can be a very large number as will be shown later. The total number of common key bits is equal to T×n. Each temporary key has n bits and for X batches of files, a total of X×n bits. Therefore, the total number of common and temporary key bits that are used to encrypt X batches of packets in the proposed algorithm is equal to T×n+X×n. In Shannon approach, the total number of key bits is equal to X×T×n. The ratio of these two values is given by Equation 8.

$$R = \frac{T \times n + X \times n}{X \times T \times n} = \frac{T + X}{X \times T} \quad (8a)$$

Which for X>>T becomes $$R \approx \frac{1}{T} \quad (8b)$$

Unlike the earlier work [26] that used random coding approach for security to achieve perfect secrecy, in the new approach there is no relationship between X, T, and n. However for large values of n, it is obvious that X>>T and X>>n. Because the common and temporary key generation are random and independent, the value of X is random (but a very large number) and can only be computed probabilistically.

To further understand the operation of the methods and the modules that implement them, various theorems and proofs are presented. Embodiments of the invention are not limited by the accuracy or completeness of the theorems and proofs.

Let each batch contains T packets and each packet consists of n bits. Further, the common keys are used for X groups. The upper bound for X to generate unique keys is given by Equation 9.

$$X < 1 + \frac{2^n}{T} \quad (9)$$

Proof. It is easy to see that for the first batch, the probability that the combination of temporary and common keys produce unique set of keys is equal to 1. Based on the construction of the common keys in A, it is obvious that it is impossible for the keys in one batch of packets to become identical since each row of A is a random uniform and unique vector of length n. However, after T set of keys K are created for the first batch of packets, for the second batch it is possible one or more keys become similar to the keys of the previous batch. The probability Pu2 of having unique keys for each key in the second batch conditioned on the keys of the first batch being unique is given by Equation 10a $$Pu2 = \frac{2^n - T}{2^n} \quad (10a)$$

This probability is the same for all the keys in this batch. The reason is that each key generated in the second batch, may be similar to one of the keys in the first batch but it is impossible to be the same as those keys in its own batch based on the common key construction scheme. Once the second batch of keys are created, for the third batch, the probability Pu3 of having unique keys conditioned on the construction of unique keys in previous batches is given by Equation 10b.

$$Pu3 = \frac{2^n - 2T}{2^n} \quad (10b)$$

Similarly, for the Xth batch of packets, the probability PuX of having unique keys assuming unique keys for the previous X−1 batches is given by Equation 10c.

$$PuX = \frac{2^n - (X-1)T}{2^n} = 1 - \frac{(X-1)T}{2^n} \tag{10c}$$

Note that each one of these probabilities should be positive. Therefore, the right hand side of Equation 10c is greater than or equal to zero. This results in equation 10d.

$$X \le \frac{2^n}{T} + 1 \tag{10d}$$

This is the upper bound value for X. Note that as X increases, the probability of the Xth batch having unique keys moves away from 1. Also, this theorem implies that as T increases, n should also increase in order to assure the existence of large number of distinct temporary keys.

In practice, each time that a temporary key is selected that provides duplicate keys, that temporary key should be excluded from further key generation. For example, assume each packet is chosen equal to 1000 bits, i.e., n=1000. The value of T can be any arbitrary number and does not depend on n or X. Assuming T=2048=$2^{11}$, the number of batches that can be encrypted, based on Equation 10d is approximately $$X \le \frac{2^{1000}}{2^{11}} + 1$$

which is a very large number. In order to avoid duplicate keys, one can choose a value for X significantly smaller than this upper bound and with high confidence, most of the temporary keys will generate unique keys. Further, the theorem demonstrates that X>>T which means that the value of R is approximately 1/T. For any application, depending on the ratio of keys to information, one can choose the appropriate value for T.

For example, if it is assumed that each packet is only 1000 bits, one can select T=5000. Then for every information bit, about $2 \times 10^{-4}$ bits are used for the key in order to achieve perfect secrecy. This surprising result provides a practical technique for securing data as an alternative to current encryption techniques. Unlike encryption that provides computational security as long as the adversary has limited computational power, information theoretic security cannot be decoded regardless of the computational capability of the adversary.

Shannon one-time pad approach states that the ratio of the key to information bits is 1. This result is also known as the impossibility result. Here it is shown that this ratio can arbitrarily tend to zero by increasing the value of $T^2$. One important question is how this approach is able to achieve a result contrary to Shannon. Reviewing the Shannon problem formulation, it is observed that there the encryption technique is applied to a single packet. The only connection between different packets is the assumption that the keys are unique and statistically independent of each other. Therefore, for this particular problem formulation, there is only a single parameter (one degree of freedom) to work with. In contrast to Shannon's approach, here the problem is formulated as providing perfect secrecy for T packets together. Further, the same (temporary) key is used for all these T packets. Therefore, in order to provide independence between keys used for different packets, a set of T common keys is introduced. The final keys that are used for encryption, are produced as a combination of temporary and common keys. Note that these assumptions provide more than one degree of freedom which allows reuse of the common keys for many batches of packets, each consisting of T packets while providing unique and independent keys for each packet. Another interesting observation is the fact that the total key bits used for the first batch of T packets has a ratio more than 1, more than Shannon approach. In the present scheme, it is the average size of keys for encrypted packets that is significantly less than 1 and depending on how many data packets are encrypted, the ratio decreases—as described above.

5. SECRECY ACHIEVED

This approach achieves arguably perfect secrecy with minimum key size requirements for distributed cloud storage system and other applications. This section is dedicated to the proof of perfect secrecy of the proposed protocol. Since the temporary keys are used for generation of all keys in one batch of T packets, it is useful to prove that the T keys generated for one batch of packets are statistically independent. Further, the common keys are used for many (e.g., X) successive batches of packets. Therefore, it is also useful to prove that two keys that are generated using the same row of matrix A for two different batches of packets are also statistically independent. This is proved for each bit of the vector key $K_i$.

Theorem. The keys belonging to the same set of files are uniformly distributed and independent of any other keys in the same set. They are also statistically independent of the files.

Proof. Let's define two keys based on Equation 4 as $$K_{i1} = [k_{i1}^1, k_{i1}^2, \ldots, k_{i1}^n]$$

$$K_{i2} = [k_{i2}^1, k_{i2}^2, \ldots, k_{i2}^n]$$

The jth bit of these two keys can be constructed using Equation 5a or 5b. Note that the jth bits of $K_{i1}$ and $K_{i2}$ are using the i1th and i2th rows of matrix A respectively. It is assumed in both cases Equation 5a is used. Note that all the other possibilities can be proved using similar argument. The jth element of the two keys are given by Equation 11a and Equation 11b, respectively.

$$k_{i1}^j = tk^1 \oplus a_{i1}^j \tag{11a}$$

$$k_{i2}^j = tk^1 \oplus a_{i2}^j \tag{11b}$$

Because $a_{i1}^j$ and $a_{i2}^j$ are randomly and uniformly distributed and they are statistically independent, therefore $k_{i1}^j$ and $k_{i2}^j$ are also statistically independent and they both have uniform distribution. Note that Crypto lemma can also be used to prove that the jth bit (1≤j≤n) of any two keys $K_{i1}$ and $K_{i2}$ within one batch of T packets have uniform distribution and are statistically independent.

Lemma 1. (Crypto lemma) Let (C, +) be a compact abelian group with group operation +, and let B=M+K, where M and K are random variables over C and K is independent of M and uniform over C. Then B is independent of M and uniform over C.

In the example embodiment, one can easily see from Equation 11a and 11b that Equation 11c holds $$k_{i1}^j \oplus a_{i1}^j = k_{i2}^j \oplus a_{i2}^j \tag{11c}$$

because both equal $tk^1$. Therefore, one can write an equality of Equation 11d.

$$k_{i1}^j \oplus a_{i1}^j \oplus a_{i2}^j = k_{i2}^j \tag{11c}$$

Assuming K in the Crypto lemma is given by Equation 11d, $$K = a_{i1}{}^{j} \oplus a_{i1}{}^{j} \quad (11d)$$

then it is easy to see that the right-hand side of Equation 11d has uniform distribution. Hence, using the Crypto lemma, it can be concluded that $k_{i1}{}^{j}$ and $k_{i2}{}^{j}$ are independent with uniform distribution. Since this is true for all the bits of these two keys, it can be concluded that any two keys inside one batch of T packets are statistically independent with uniform distribution.

In the method presented here, the common keys in matrix A are used for multiple (X) batches. The next theorem proves that these keys are constructed for multiple batches are also statistically independent. Consider the batch X1 and the batch X2 of the X batches using the same common keys in matrix A. Each batch contains T packets. These two batches use different temporary keys $TK_{X1}$ and $TK_{X2}$ to construct vector keys $K_i$ (X1) and $K_i$ (X2) for the ith packet in each batch.

In order to prove the independence of the keys $K_i$ (X1) and $K_i$ (X2), keys that are generated for these two groups of files using the same row from matrix A are compared. Further, it is assumed that the j1th elements of keys keys $K_i$ (X1) and $K_i$ (X2) are derived using the same condition, e.g., given by Equation 5a. This condition is more likely to generate statistically dependent elements in these two keys. For example, if one key uses the condition of Equation 5a and the other key uses the condition of Equation 5b for construction of the keys, in that case clearly both the temporary and common elements of key construction are different and it is obvious to see the key bits for these two different keys in that location are statistically independent. For this reason, the independence for the worse possible case is proven here; and the proof for other possible cases follows similarly.

Theorem. The keys used for each batch of T packets are uniformly distributed and statistically independent of the keys generated from other batches of packets.
proven here; and the proof for other possible cases follows similarly.

Proof. The key generation of encrypted packets in each batch consists of combining (by an XOR operation) two randomly uniformly distributed vectors that are statistically independent of each other and independent of the data. Therefore, using those keys will provide perfect secrecy.

Consider the jth bit of the ith key for the X1 and X2 batches, as given by Equations 12a and 12b, respectively.

$$k_i{}^{j}(X1) = tk^{j}(X1) \oplus a_i{}^{j} \quad (12a)$$

$$k_i{}^{j}(X2) = tk^{j}(X2) \oplus a_i{}^{j} \quad (12a)$$

For these two key bits, the common key $a_i{}^{j}j$ is the same in construction of the keys but they use two different temporary key bits, $tk^{j}(X1)$ and $tk^{j}(X2)$ that are statistically independent. Using similar argument as the preceding theorem 1, and by observing the relationship of Equation 12c $$k_i{}^{j}(X1) \oplus tk^{j}(X1) = k_i{}^{j}(X2) \oplus tk^{j}(X2) \quad (12c)$$

because both equal $a_i{}^{j}$; and, by transferring the temporary keys to one side of the equality, one gets Equation 12d.

$$k_i{}^{j}(X1) \oplus tk^{j}(X1) \oplus tk^{j}(X2) = k_i{}^{j}(X2) \quad (12d)$$

One then uses the Crypto lemma to conclude that $k_i{}^{j}(X1)$ and $k_i{}^{j}(X2)$ are statistically independent with uniform distribution.

Consider the j1th row of X1 batch with the j2th row of X2 batch of T packets. Under this condition, since both the temporary keys and common keys for generation of the final keys $K_{j1}(X1)$ and $K_{j2}(X2)$ are statistically independent of each other and uniformly distributed, clearly the final keys are also uniformly distributed and independent. However, it is possible (even if it is very low probability) that they generate identical keys. This case is similar to Shannon one-time pad; but, such temporary keys should not be used to assure uniqueness of keys used to achieve perfect secrecy. This case was discussed above with respect to Equations 10a through 10d and can be controlled by the selection of X much less than the value for probably unique keys.

6. SIMULATION

Figure 3:
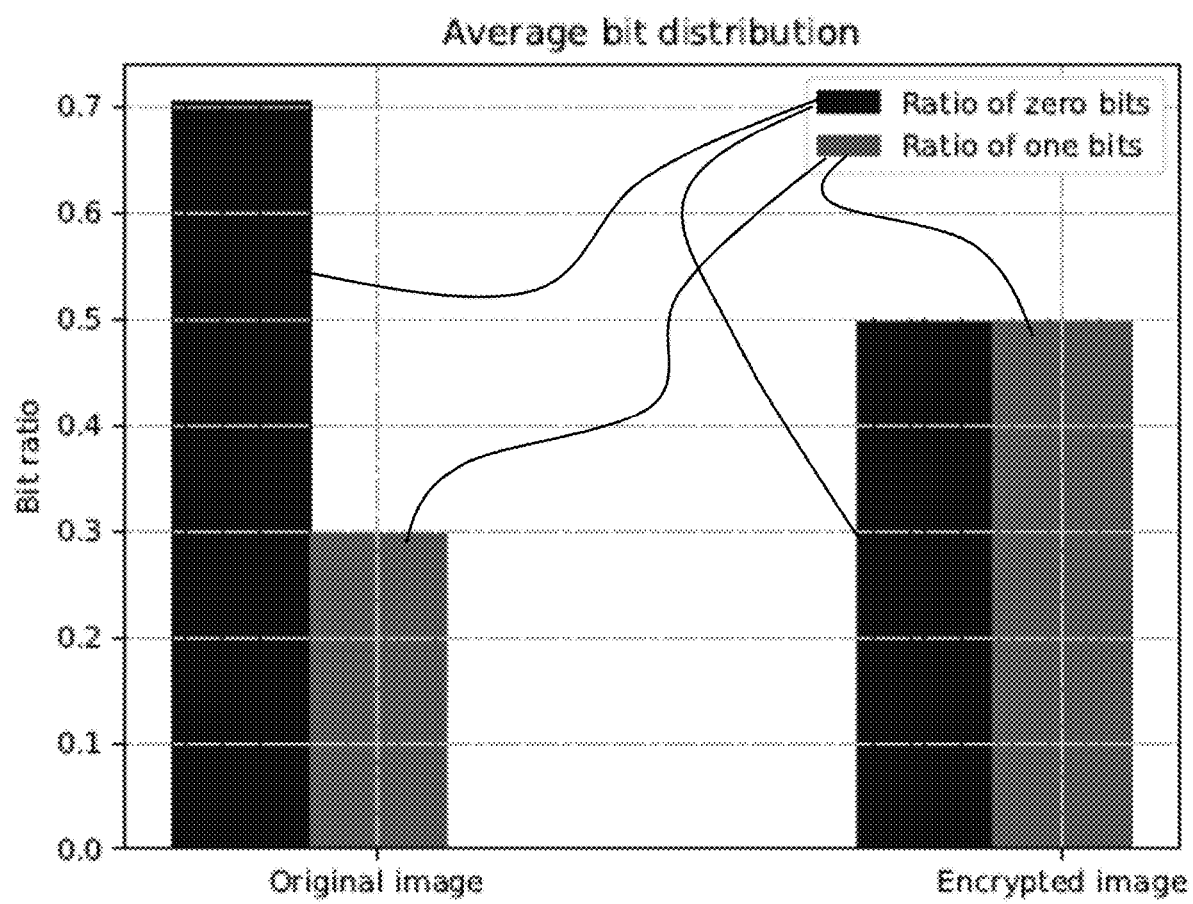
FIG. 3 is a plot that illustrates effective encryption, according to an embodiment.

FIG. 3 demonstrates the simulation results for one image packet with a size of 2.8 MB ($22.4 \times 10^6$ bits). The bar plot in the left of this figure shows the distribution of zeros and ones. For this particular example, approximately 71% of the packet includes zeros and the rest are ones. We have divided this packet into smaller packets of size 5 KB (n=40 Kbits) and T=560. After using the proposed algorithm for encryption, the right side of FIG. 3 demonstrates the bit distribution of the encrypted image. As can be seen, the bit distribution tends to uniform distribution. Note that in this technique, the probability of encrypted packets is uniformly distributed regardless of the value of packet size n. However, if the size of a packet is selected long enough, then the actual number of zeros and ones will be much closer. For example, in the illustrated embodiment, when n=40 Kbits, then the average ratio of zeros and ones are equal to 0.4999999973 and 0.5000000027, respectively. For the same example, when n=4 Kbits, the average ratio of zeros and ones after encryption is equal to 0.4999176221 and 0.5000823779 respectively. However, in both cases, the encrypted signal is perfectly secure as will be proven in the next section.

Note that for this particular example, the value of R is approximately equal to 0.001786. This approach allows a larger value for T to reduce the ratio of key bits over information bits based on this particular application. When the T is increased, the system originally stores a larger size common key matrix in A while the average ratio of key bits to information bits reduces. It is important to mention that the proposed algorithm is useful for cases where the user deals with large number of packets which is currently the case for most applications.

7. COMPUTATIONAL HARDWARE OVERVIEW

Figure 4:
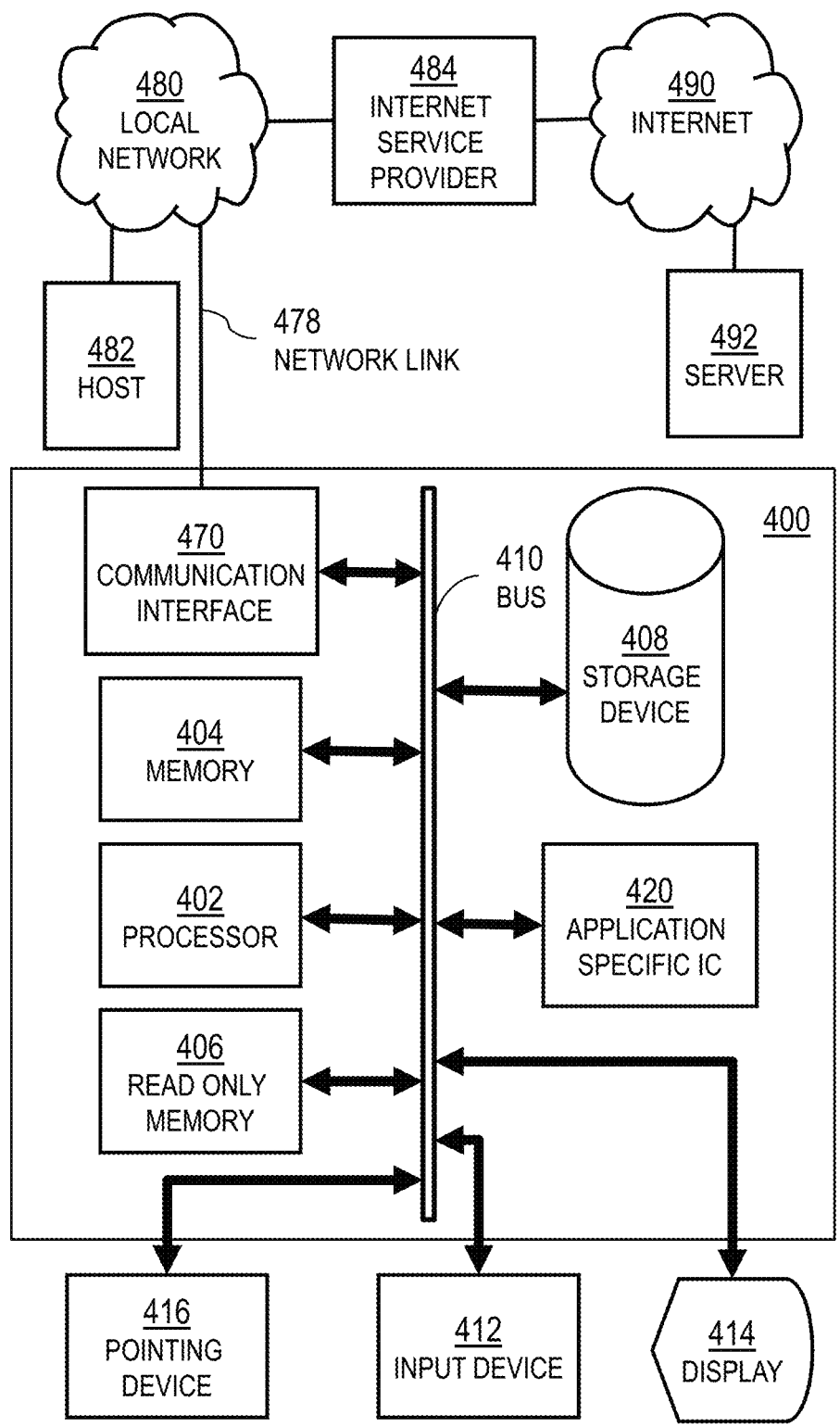
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

Figure 5:
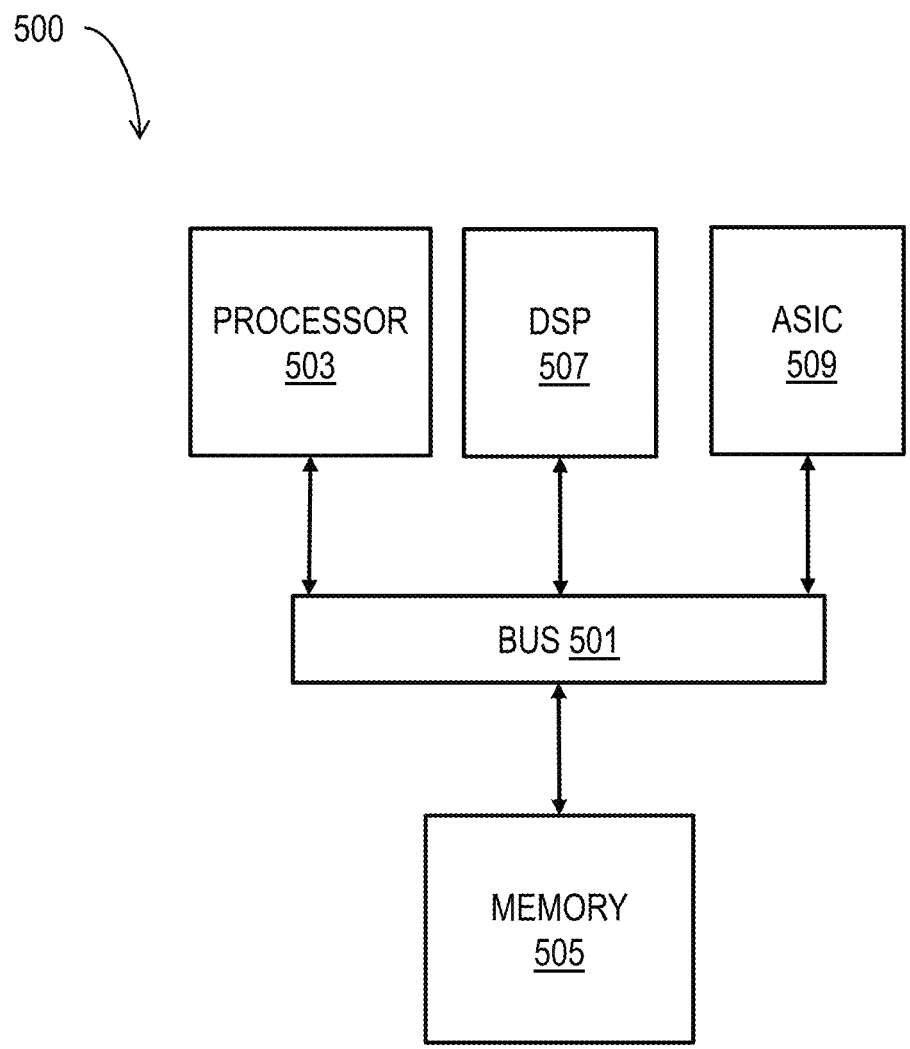
FIG. 5 illustrates a chip set upon which an embodiment of the invention may be implemented.

FIG. 5 illustrates a chip set 500 upon which an embodiment of the invention may be implemented. Chip set 500 is programmed to perform one or more steps of a method described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of a method described herein.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 505 also stores the data associated with or generated by the execution of one or more steps of the methods described herein.

Figure 6:
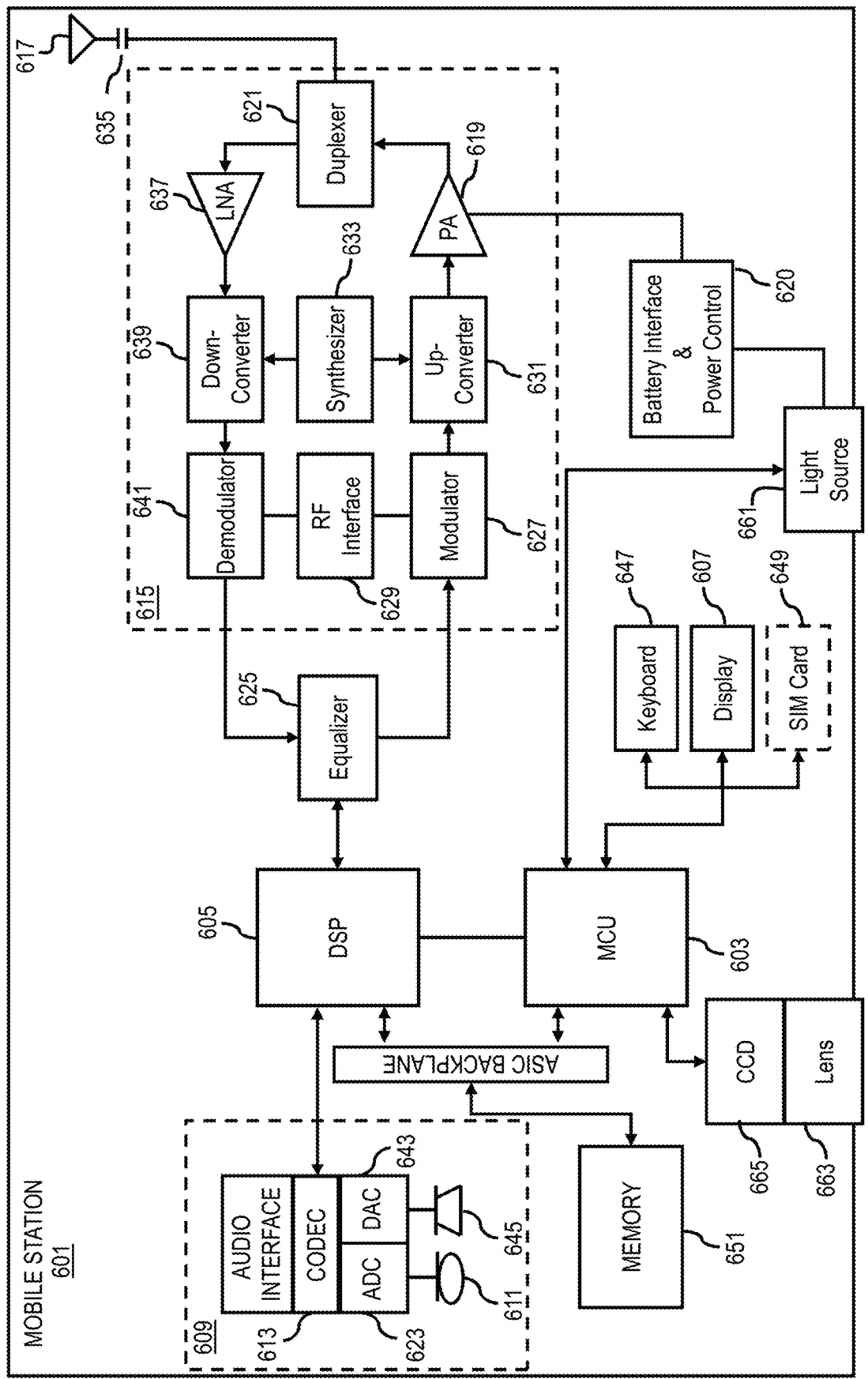
FIG. 6 is a diagram that illustrates example components of a mobile terminal (e.g., cell phone handset) for communications, which is capable of operating in the system of FIG. 1, according to one embodiment.

FIG. 6 is a diagram of exemplary components of a mobile terminal 600 (e.g., cell phone handset) for communications, which is capable of operating in the system of FIG. 1, according to one embodiment. In some embodiments, mobile terminal 601, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps as described herein. The display 607 includes display circuitry configured to display at least a portion of a user interface of the mobile terminal (e.g., mobile telephone). Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603 which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 as described herein. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

In some embodiments, the mobile terminal 601 includes a digital camera comprising an array of optical detectors, such as charge coupled device (CCD) array 665. The output of the array is image data that is transferred to the MCU for further processing or storage in the memory 651 or both. In the illustrated embodiment, the light impinges on the optical array through a lens 663, such as a pin-hole lens or a material lens made of an optical grade glass or plastic material. In the illustrated embodiment, the mobile terminal 601 includes a light source 661, such as a LED to illuminate a subject for capture by the optical array, e.g., CCD 665. The light source is powered by the battery interface and power control module 620 and controlled by the MCU 603 based on instructions stored or loaded into the MCU 603.

8. ALTERNATIVES, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

9. REFERENCES

Each of the following references is hereby incorporated by reference as if fully set forth herein, except for terminology inconsistent with that used herein.
1. Claude E Shannon. Communication theory of secrecy systems. Bell Labs Technical Journal, 28(4):656-715, 1949.
2. Alexandros G Dimakis, P Brighten Godfrey, Yunnan Wu, Martin J Wainwright, and Kannan Ramchandran. Network coding for distributed storage systems. IEEE Transactions on Information Theory, 56(9):4539-4551, 2010.
3. Theodoros K Dikaliotis, Alexandros G Dimakis, and Tracey Ho. Security in distributed storage systems by communicating a logarithmic number of bits. In Information Theory Proceedings (ISIT), 2010 IEEE International Symposium on, pages 1948-1952. IEEE, 2010.
4. Sameer Pawar, Salim El Rouayheb, and Kannan Ramchandran. On secure distributed data storage under repair dynamics. In Information Theory Proceedings (ISIT), 2010 IEEE International Symposium on, pages 2543-2547. IEEE, 2010.
5. Sameer Pawar, Salim El Rouayheb, and Kannan Ramchandran. Securing dynamic distributed storage systems against eavesdropping and adversarial attacks. IEEE Transactions on Information Theory, 57(10):6734-6753, 2011.
6. Sameer Pawar, Salim El Rouayheb, and Kannan Ramchandran. Securing dynamic distributed storage systems from malicious nodes. In Information Theory Proceedings (ISIT), 2011 IEEE International Symposium on, pages 1452-1456. IEEE, 2011.
7. Nihar B Shah, K V Rashmi, and P Vijay Kumar. Information—theoretically secure regenerating codes for distributed storage. In Global Telecommunications Conference (GLOBECOM 2011), 2011 IEEE, pages 1-5. IEEE, 2011.
8. Ankit Singh Rawat, Onur Ozan Koyluoglu, Natalia Silberstein, and Sriram Vishwanath. Optimal locally repairable and secure codes for distributed storage systems. IEEE Transactions on Information Theory, 60(1):212-236, 2014.
9. Alexandros G Dimakis, Vinod Prabhakaran, and Kannan Ramchandran. Distributed fountain codes for networked storage. In Acoustics, Speech and Signal Processing, 2006. ICASSP 2006 Proceedings. 2006 IEEE International Conference on, volume 5, pages V-V. IEEE, 2006.
10. Siddhartha Kumar, Eirik Rosnes, and Alexandre Graell i Amat. Secure repairable fountain codes. IEEE Communications Letters, 20(8):1491-1494, 2016.
11. Ning Cai and Raymond W Yeung. Secure network coding. In Information Theory, 2002. Proceedings. 2002 IEEE International Symposium on, page 323. IEEE, 2002.
12. Kapil Bhattad, Krishna R Narayanan, et al. Weakly secure network coding. NetCod, April, 104, 2005.
13. Swanand Kadhe and Alex Sprintson. On a weakly secure regenerating code construction for minimum storage regime. In Communication, Control, and Computing (Allerton), 2014 52nd Annual Allerton Conference on, pages 445-452. IEEE, 2014.
14. Swanand Kadhe and Alex Sprintson. Weakly secure regenerating codes for distributed storage. In Network Coding (NetCod), 2014 International Symposium on, pages 1-6. IEEE, 2014.
15. Muxi Yan, Alex Sprintson, and Igor Zelenko. Weakly secure data exchange with generalized reed solomon codes. In Information Theory (ISIT), 2014 IEEE International Symposium on, pages 1366-1370. IEEE, 2014.
16. Muxi Yan and Alex Sprintson. Algorithms for weakly secure data exchange. In Network Coding (NetCod), 2013 International Symposium on, pages 1-6. IEEE, 2013.
17. Matthieu Bloch and Joao Barros. Physical-layer security: from information theory to security engineering. Cambridge University Press, 2011.
18. Willie K Harrison and Steven W McLaughlin. Physical-layer security: Combining error control coding and cryptography. In Communications, 2009. ICC'09. IEEE International Conference on, pages 1-5. IEEE, 2009.
19. Byung-Jae Kwak, Nah-Oak Song, Bumsoo Park, Demijan Klinc, and Steven W McLaughlin. Physical layer security with yarg code. In Emerging Network Intelligence, 2009 First International Conference on, pages 43-48. IEEE, 2009.
20. Mohsen Karimzadeh Kiskani and Hamid R Sadjadpour. Secure coded caching in wireless ad hoc networks. In Computing, Networking and Communications (ICNC), 2017 International Conference on, pages 387-391. IEEE, 2017.
21. Mohsen Karimzadeh Kiskani and Hamid R Sadjadpour. Throughput analysis of decentralized coded content caching in cellular networks. IEEE Transactions on Wireless Communications, 16(1):663-672, 2017.

22. Mohsen Karimzadeh Kiskani and Hamid R Sadjadpour. A secure approach for caching contents in wireless ad hoc networks. IEEE Transactions on Vehicular Technology, 66(11):10249-10258, 2017.
23. Mohsen Karimzadeh Kiskani and Hamid R Sadjadpour. Secure and private cloud storage systems with random linear fountain codes. In Cloud and Big Data Computing (CBDCOM), 2017 International Conference on. IEEE, 2017.
24. Mohsen Karimzadeh Kiskani, Hamid R Sadjadpour, Mohammad Reza Rahimi, and Fred Etemadieh. Low complexity secure code (LCSC) design for big data in cloud storage systems. In Communications (ICC), 2018 International Conference on. IEEE, 2018.
25. G David Forney Jr. On the role of MMSE estimation in approaching the information-theoretic limits of linear gaussian channels: Shannon meets wiener. arXiv preprint cs/0409053, 2004.
26. Sadjadpour et al. "Compact Key Encoding of Data for Public Exposure such as Cloud Storage" 25 Apr. 2018 U.S. provisional patent application 62/662,557 and 6 Sep. 2018, U.S. provisional patent application No. 62/727,636.

What is claimed is:

1. A method implemented on a hardware processor for secure remote digital storage, the method comprising:
   a. extracting first digital data comprising one or more batches, each batch comprising a plurality of no more than a number T of packets, each packet containing a plurality of a number n of bits;
   b. generating a random binary matrix A consisting of T rows and n columns;
   c. for a first batch of the batches, generating a secret first random n-bit temporary key; and
   d. for a first packet in the first batch,
      generating a first packet vector key with each element j=1 to n of the first packet vector key equal to an element from the temporary key combined using an exclusive OR function with a corresponding element from a first packet-corresponding row of matrix A,
      generating a first encrypted packet based on the first packet and the first packet vector key, and
      causing the first encrypted packet to be exposed publicly.

2. The method as recited in claim 1, further comprising performing step d for all packets of the plurality of packets in the first batch.

3. The method as recited in claim 2, further comprising storing on a computer readable medium, on a secure device, key data that indicates the matrix A and the temporary key and the random non-overlapping pairs of bit positions for all packets in the first batch.

4. The method as recited in claim 1, further comprising performing steps c and d for all batches of the one or more batches.

5. The method as recited in claim 1, further comprising storing in a computer readable medium, on a secure device, key data that indicates the matrix A and the first temporary key and the random non-overlapping pairs of bit positions.

6. The method as recited in claim 5, further comprising decoding the encrypted packet based on the key data.

7. The method as recited in claim 1, wherein the hardware processor is a local device with physical security and causing the first encrypted packet to be exposed publicly further comprises storing the first encrypted packet at a remote device without physical security.

8. The method as recited in claim 1, wherein the random non-overlapping pairs of bit positions are produced separately for each packet of the plurality of packets in each batch of the one or more batches.

9. The method as recited in claim 1, wherein the random n-bit temporary key is produced separately for each batch of the one or more batches.

10. The method of claim 1, further comprising exchanging bit positions of the first packet vector key elements responsive to a predetermined relationship between each element of the temporary key combined using an exclusive OR function with a corresponding element from the first packet-corresponding row of matrix A.

11. A non-transitory computer-readable medium carrying one or more sequences of instructions for secure remote digital storage, wherein execution of the one or more sequences of instructions by one or more processors causes the one or more processors to perform the steps of:
   a. extracting first digital data comprising one or more batches, each batch comprising a plurality of no more than a number T of packets, each packet containing a plurality of a number n of bits;
   b. generating a random binary matrix A consisting of T rows and n columns;
   c. for a first batch of the batches, generating a secret first random n-bit temporary key; and
   d. for a first packet in the first batch,
      generating a first packet vector key with each element j=1 to n of the first packet vector key equal to an element from the temporary key combined using an exclusive OR function with a corresponding element from a first packet-corresponding row of matrix A,
      generating a first encrypted packet based on the first packet and the first packet vector key, and
      causing the first encrypted packet to be exposed publicly.

12. The non-transitory computer-readable medium as recited in claim 11, wherein execution of the one or more sequences of instructions by the one or more processors further causes the one or more processors to perform step d for all packets of the plurality of packets in the first batch.

13. The non-transitory computer-readable medium as recited in claim 12, wherein execution of the one or more sequences of instructions by the one or more processors further causes the one or more processors to perform storing on a computer readable medium, on a secure device, key data that indicates the matrix A and the temporary key and the random non-overlapping pairs of bit positions for all packets in the first batch.

14. The non-transitory computer-readable medium as recited in claim 11, wherein execution of the one or more sequences of instructions by the one or more processors further causes the one or more processors to perform steps c and d for all batches of the one or more batches.

15. The non-transitory computer-readable medium as recited in claim 11, wherein execution of the one or more sequences of instructions by the one or more processors further causes the one or more processors to perform storing in a computer readable medium, on a secure device, key data that indicates the matrix A and the first temporary key and the random non-overlapping pairs of bit positions.

16. The non-transitory computer-readable medium as recited in claim 15, wherein execution of the one or more sequences of instructions by the one or more processors further causes the one or more processors to perform decoding the encrypted packet based on the key data.

17. The non-transitory computer-readable medium as recited in claim 11, wherein the hardware processor is a local device with physical security and causing the first encrypted packet to be exposed publicly further comprises storing the first encrypted packet at a remote device without physical security.

18. The non-transitory computer-readable medium as recited in claim 11, wherein the random non-overlapping pairs of bit positions are produced separately for each packet of the plurality of packets in each batch of the one or more batches.

19. The non-transitory computer-readable medium as recited in claim 11, wherein the random n-bit temporary key is produced separately for each batch of the one or more batches.

20. The method of claim 11, further comprising exchanging bit positions of the first packet vector key elements responsive to a predetermined relationship between each element of the temporary key combined using an exclusive OR function with a corresponding element from the first packet-corresponding row of matrix A.

21. A system for secure remote digital storage comprising:
at least one processor; and
at least one memory including one or more sequences of instructions,
the at least one memory and the one or more sequences of instructions configured to, with the at least one processor, cause the system to perform at least the following,
   a. extracting first digital data comprising one or more batches, each batch comprising a plurality of no more than a number T of packets, each packet containing a plurality of a number n of bits;
   b. generating a random binary matrix A consisting of T rows and n columns;
   c. for a first batch of the batches, generating a secret first random n-bit temporary key; and
   d. for a first packet in the first batch,
      generating a first packet vector key with each element j=1 to n of the first packet vector key equal to an element from the temporary key combined using an exclusive OR function with a corresponding element from a first packet-corresponding row of matrix A,
      generating a first encrypted packet based on the first packet and the first packet vector key, and
      causing the first encrypted packet to be exposed publicly.

22. The system as recited in claim 21, wherein execution of the one or more sequences of instructions by the one or more processors further causes the one or more processors to perform step d for all packets of the plurality of packets in the first batch.

23. The system as recited in claim 22, wherein execution of the one or more sequences of instructions by the one or more processors further causes the one or more processors to perform storing on a computer readable medium, on a secure device, key data that indicates the matrix A and the temporary key and the random non-overlapping pairs of bit positions for all packets in the first batch.

24. The system as recited in claim 21, wherein execution of the one or more sequences of instructions by the one or more processors further causes the one or more processors to perform steps c and d for all batches of the one or more batches.

25. The system as recited in claim 21, wherein execution of the one or more sequences of instructions by the one or more processors further causes the one or more processors to perform storing in a computer readable medium, on a secure device, key data that indicates the matrix A and the first temporary key and the random non-overlapping pairs of bit positions.

26. The system as recited in claim 25, wherein execution of the one or more sequences of instructions by the one or more processors further causes the one or more processors to perform decoding the encrypted packet based on the key data.

27. The system as recited in claim 21, wherein the hardware processor is a local device with physical security and causing the first encrypted packet to be exposed publicly further comprises storing the first encrypted packet at a remote device without physical security.

28. The system as recited in claim 21, wherein the random non-overlapping pairs of bit positions are produced separately for each packet of the plurality of packets in each batch of the one or more batches.

29. The system as recited in claim 21, wherein the random n-bit temporary key is produced separately for each batch of the one or more batches.

30. The method of claim 21, further comprising exchanging bit positions of the first packet vector key elements responsive to a predetermined relationship between each element of the temporary key combined using an exclusive OR function with a corresponding element from the first packet-corresponding row of matrix A.

* * * * *